United States Patent [19]

Lee

[11] Patent Number: 5,245,254
[45] Date of Patent: Sep. 14, 1993

[54] HORIZONTAL FOCUS CIRCUIT IN AN IMAGE DISPLAY

[75] Inventor: Kang Woo Lee, Anang, Rep. of Korea

[73] Assignee: Gold Star Co., Ltd., Seoul, Rep. of Korea

[21] Appl. No.: 913,418

[22] Filed: Jul. 15, 1992

[51] Int. Cl.$^5$ ............................................. H01J 29/58
[52] U.S. Cl. ...................................................... 315/382
[58] Field of Search ......................................... 315/382

[56] References Cited

U.S. PATENT DOCUMENTS

| 4,622,498 | 11/1986 | Lester | 315/382 |
| 4,891,564 | 1/1990 | Crowley | 315/382 |
| 4,961,031 | 10/1990 | Nakagawa et al. | 315/382 |

*Primary Examiner*—Gregory C. Issing
*Attorney, Agent, or Firm*—Keck, Mahin & Cate

[57] ABSTRACT

A horizontal focus circuit in an image display for improving the focus characteristics at the edges of a planar CRT screen or a CRT screen used in a multi-sync mode. The horizontal focus circuit comprises a horizontal output portion for generating a flyback pulse, a horizontal dummy transformer for transforming the flyback pulse supplied from the horizontal output portion, a parabolic output circuit for generating a parabolic signal from the transformed flyback pulse supplied from the horizontal dummy transformer, a voltage circuit for rectifying and integrating the transformed flyback pulse supplied from the horizontal dummy transformer to generate a direct current (DC) voltage, a mode selection portion for generating a mode selection signal according to the sync frequency, a differential amplifying circuit for combining the mode selection signal supplied from the mode selection portion and the parabolic signal supplied from the parabolic output circuit, leveling up the DC voltage of the combined signal by a DC voltage supplied from the voltage circuit, and amplifying the combined and leveled-up parabolic signal, and a cascode amplifying circuit for controlling and amplifying the amplitude and frequency characteristics of the parabolic signal supplied from the differential amplifying circuit and supplying the amplified parabolic singal to a focusing grid of the CRT.

5 Claims, 5 Drawing Sheets

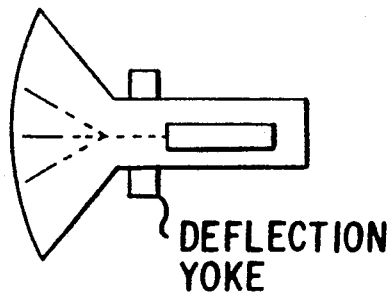
FIG. 1A
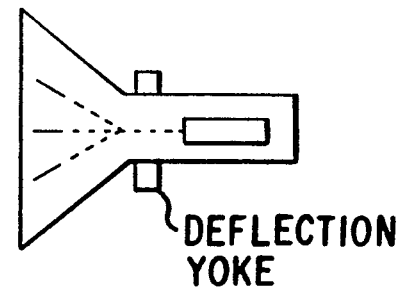
FIG. 1B
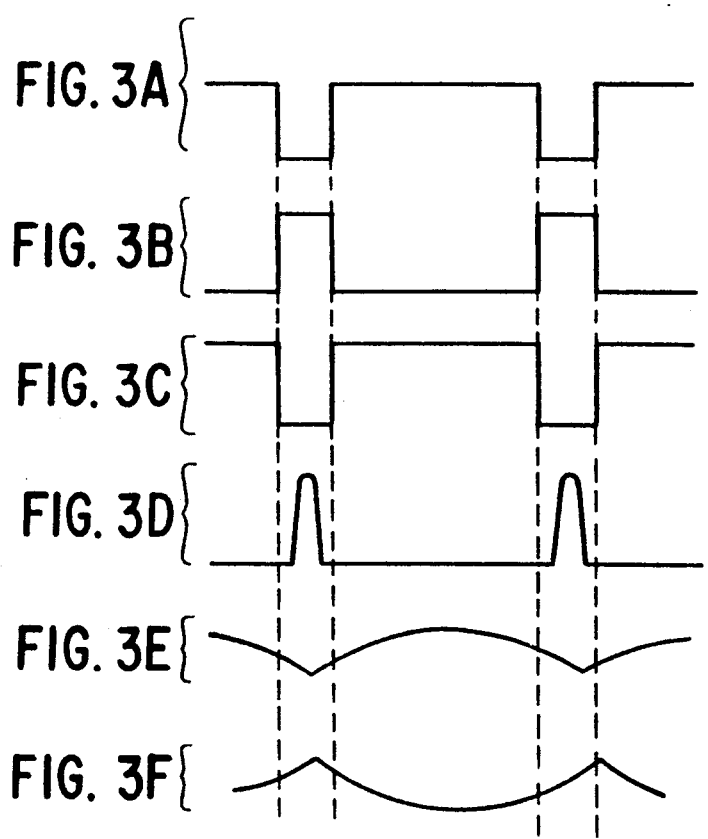

HORIZONTAL FOCUS CIRCUIT IN AN IMAGE DISPLAY

BACKGROUND OF THE INVENTION

The present invention relates to a horizontal focus circuit in an image display using a cathode ray tube (CRT), and more particularly to a horizontal focus circuit which can improve the focus of an electron beam scanned at both edges of the screen of a planar cathode ray tube.

Generally, an image display such as a television receiver, a monitor, etc. displays an image using a cathode ray tube. Such an image display comprises a horizontal focus circuit for controlling the focus of an electron beam scanned on the CRT screen. In conventional art, the CRT screen has changed in recent years from a spherical shape as shown in FIG. 1A to a planar shape as shown in FIG. 1B. The image display drives the CRT by various sync signals having different frequencies. The horizontal focus circuit should generate an output signal whose frequency and amplitude characteristics vary according to the screen shape of such a CRT and the frequency of the sync signal. However, since the conventional horizontal focus circuit has a single frequency and amplitude characteristics, it has the problem of not being applicable to a planar CRT or a CRT having a different number of scanning lines. The above-mentioned problem will be described with reference to FIG. 2, which shows a conventional horizontal focus circuit, and to FIGS. 3A to 3F, which show output waveform diagrams for the several portions of the circuit shown in FIG. 2.

Referring to FIG. 2, a horizontal deflection circuit 10 processes a horizontal sync signal applied via an input terminal 5 to generate a deflection driving signal as shown in FIG. 3A. A transistor Q1 inverts the deflection driving signal applied to its base through a rsistor R1 from the horizontal deflection circuit 10, yielding the signal shown in FIG. 3B. A first transformer T1 inverts and boosts the deflection driving signal inverted by the transistor Q1, as and supplies the boosted deflection driving signal shown in FIG. 3C, to the base of a transistor Q2 through a filter composed of two resistors R3 and R4 and a capacitor C3. The transistor Q2 inverts the signal filtered by the filter and supplies a flyback pulse, as shown in FIG. 3D, to a second transformer T2. The second transformer T2 then generates a deflection output from the flyback pulse supplied from the transistor Q2 and applies it to a deflecting yoke HDY through a serial circuit composed of a resistor R6 and a capacitor C5, and a coil C1 connected in parallel with the serial circuit. A capacitor C6 connected in series with the deflecting yoke HDY integrates the deflection signal applied to the deflection yoke HDY, rendering it a parabola signal as shown in FIG. 3E, and applies the parabola signal to a third transformer T3 through a resistor R7 and a capacitor C7. The third transformer T3 inverts and boosts the parabola signal supplied from the capacitor C7, and applies the (inverted) boosted parabola signal, shown in FIG. 3F, to a focusing grid of the CRT through the resistor R7 and a capacitor C8.

The conventional horizontal focus circuit integrates the deflection signal supplied by the capacitor C6 and supplies the integrated parabolic signal to the focusing grid, thereby controlling the focus of electron beam at the edges of the conventional spherical CRT screen. However, when the conventional horizontal focus circuit is applied to a planar CRT and a multi-sync monitor having various sync frequencies, it is not suitable and there is a problem in that the electron beam is defocused at the edges of the screen.

SUMMARY OF THE INVENTION

Accordingly, it is an object of the present invention to provide a horizontal focus circuit in which the electron beam can be precisely focused at the edges of a planar CRT screen.

To achieve the object, the horizontal focus circuit of the present invention comprises a horizontal output portion for generating a flyback pulse, a horizontal dummy transformer for transforming the flyback pulse supplied from the horizontal output portion, a parabolic output circuit for generating a parabolic signal from the transformed flyback pulse supplied from the horizontal dummy transformer, a voltage circuit for rectifying and integrating the transformed flyback pulse supplied from the horizontal dummy transformer to generate a direct-current (DC) voltage, a mode selection portion for generating a mode selection signal according to the sync frequency, a differential amplifying circuit for combining the mode selection signal supplied from the mode selection portion and the parabolic signal supplied from the parabolic output circuit, leveling up the DC voltage of the combined signal by a DC voltage supplied from the voltage circuit, and amplifying the combined and leveled-up parabolic signal, and a cascode amplifying circuit for controlling and amplifying the amplitude and frequency characteristic of the parabolic signal supplied from the differential amplifying circuit and supplying it to a fourth grid of the CRT.

BRIEF DESCRIPTION OF THE DRAWINGS

The above object and other advantages of the present invention will become more apparent by describing the preferred embodiment of the present invention with reference to the attached drawings, in which;

FIG. 1A is a sectional view of a conventional spherical CRT;

FIG. 1B is a sectional view of a conventional planar CRT;

FIGS. 3A to 3F show the output waveforms outputted at the several portions shown in FIG. 2;

DETAILED DESCRIPTION OF THE INVENTION

Figure 2:
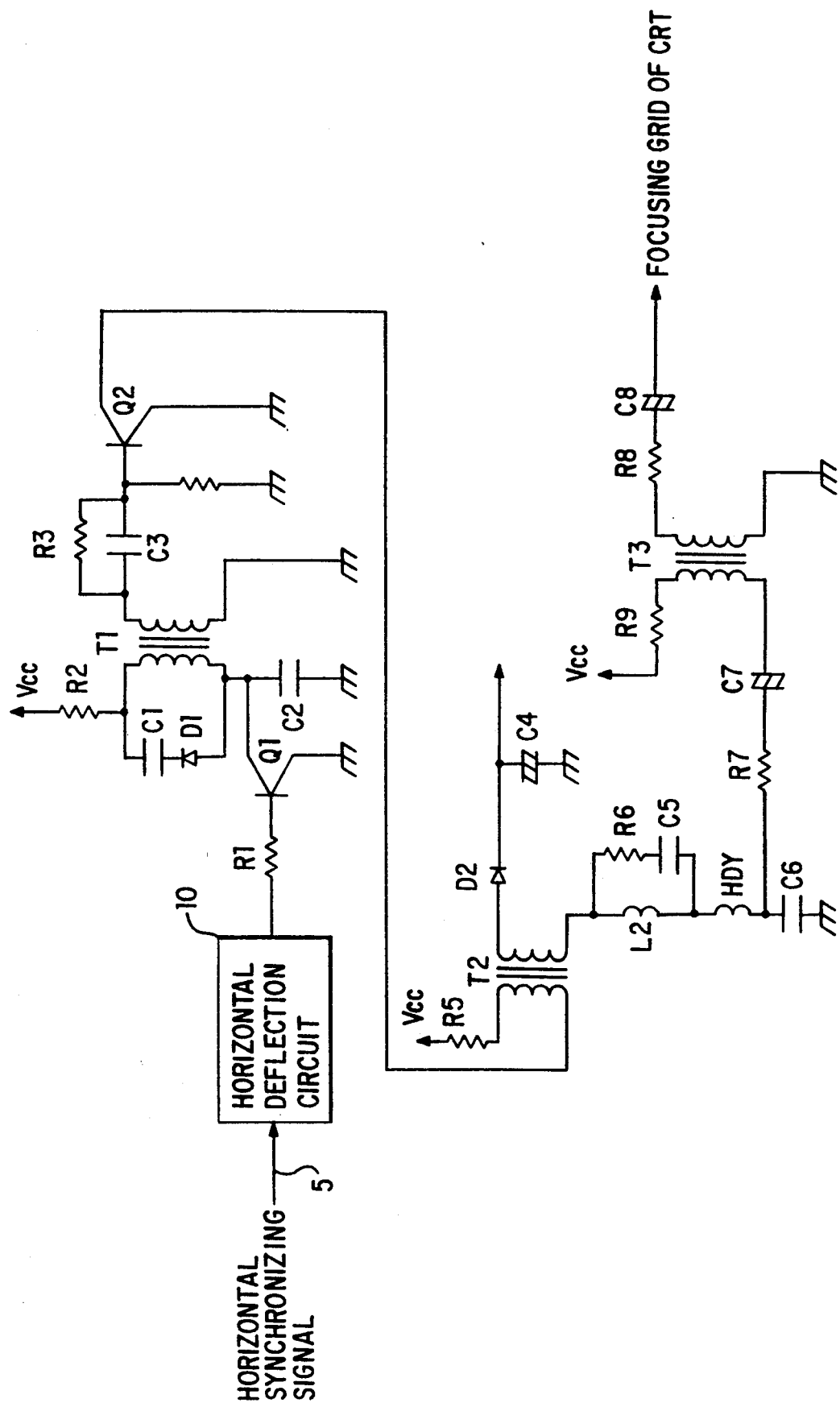
FIG. 2 is a circuit diagram of a conventional horizontal focus circuit.
Figure 4:
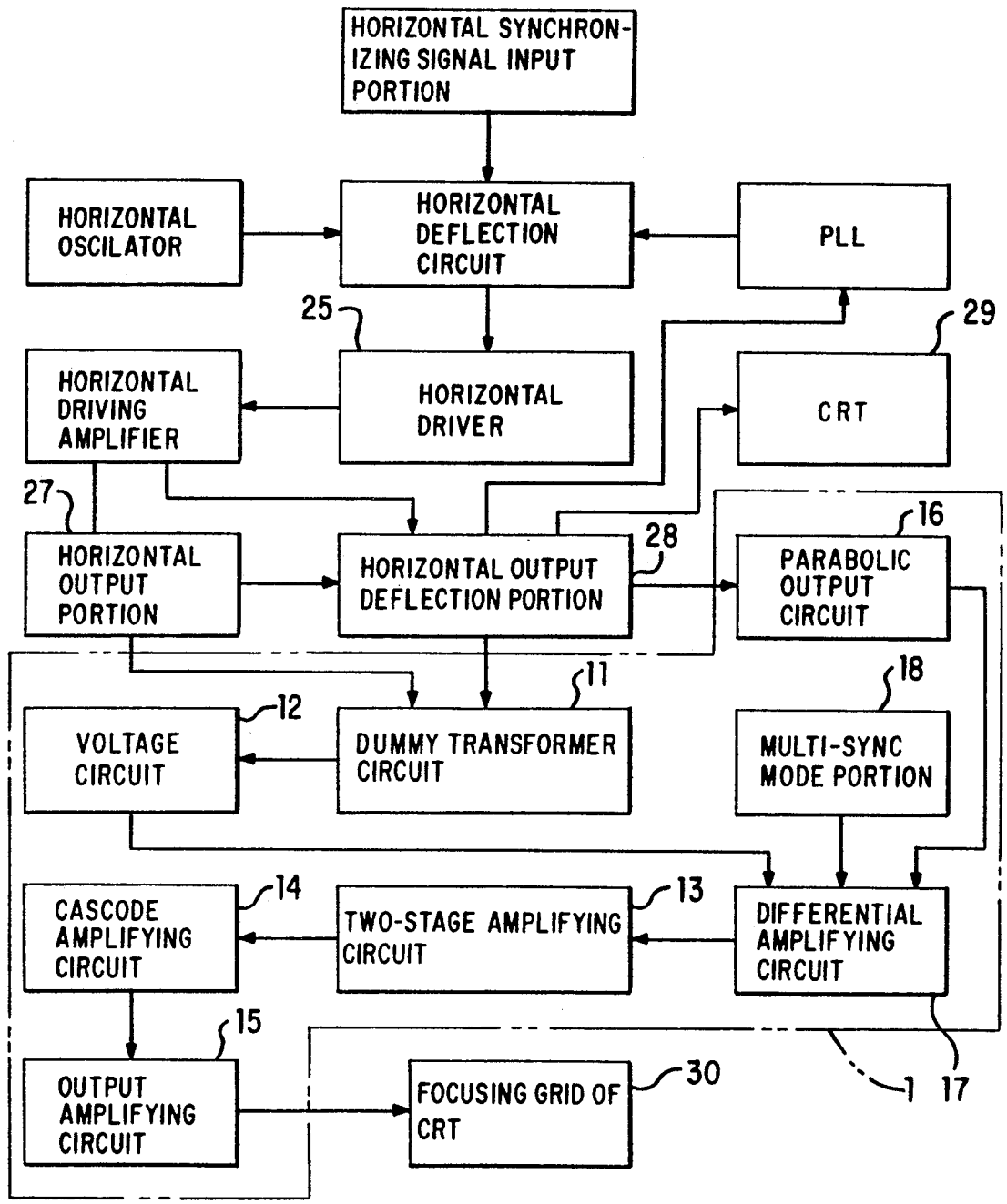
FIG. 4 is a block diagram of the horizontal focus circuit according to an embodiment of the present invention.

FIG. 4 shows a horizontal focus circuit of an image display comprising an edge focus controller 1, according to an embodiment of the present invention. Referring to FIG. 4, the horizontal focus circuit of the image display comprises the edge focus controller 1 for controlling the edge focus, connected between a horizontal output portion 27, a horizontal output deflection portion 28, and a CRT's focusing grid 30.

The edge focus controller 1 comprises a horizontal dummy transformer circuit 11 connected to the horizontal output portion 27 and the horizontal output deflection portion 28, a voltage circuit 12 connected to the horizontal dummy transformer circuit 11, for generating a DC voltage, and a parabolic output circuit 16 connected to the horizontal output deflection portion 28 for generating a parabolic signal.

The edge focus controller 1 comprises a differential amplifying circuit 17, which combines a mode selection signal supplied from a multi-sync mode portion 18 and an output of the parabolic output circuit 16, levels up the combined signal by the DC voltage supplied from the voltage circuit 12, and then amplifies the leveled-up parabolic signal, supplying it to a two-stage amplifying circuit 13. The two-stage amplifying circuit 13 amplifies the differentially amplified parabolic signal supplied from the differential amplifying circuit 17 and supplies it to a cascode amplifying circuit 14. The cascode amplifying circuit 14 again amplifies the amplified parabolic signal from the two-stage amplifying circuit 13 and supplies it to an output amplifying circuit 15. The output amplifying circuit 15 finally amplifies the again-amplified parabolic signal from the cascode amplifying circuit 14 and supplies it to the focusing grid 30 of a CRT.

Figure 5:
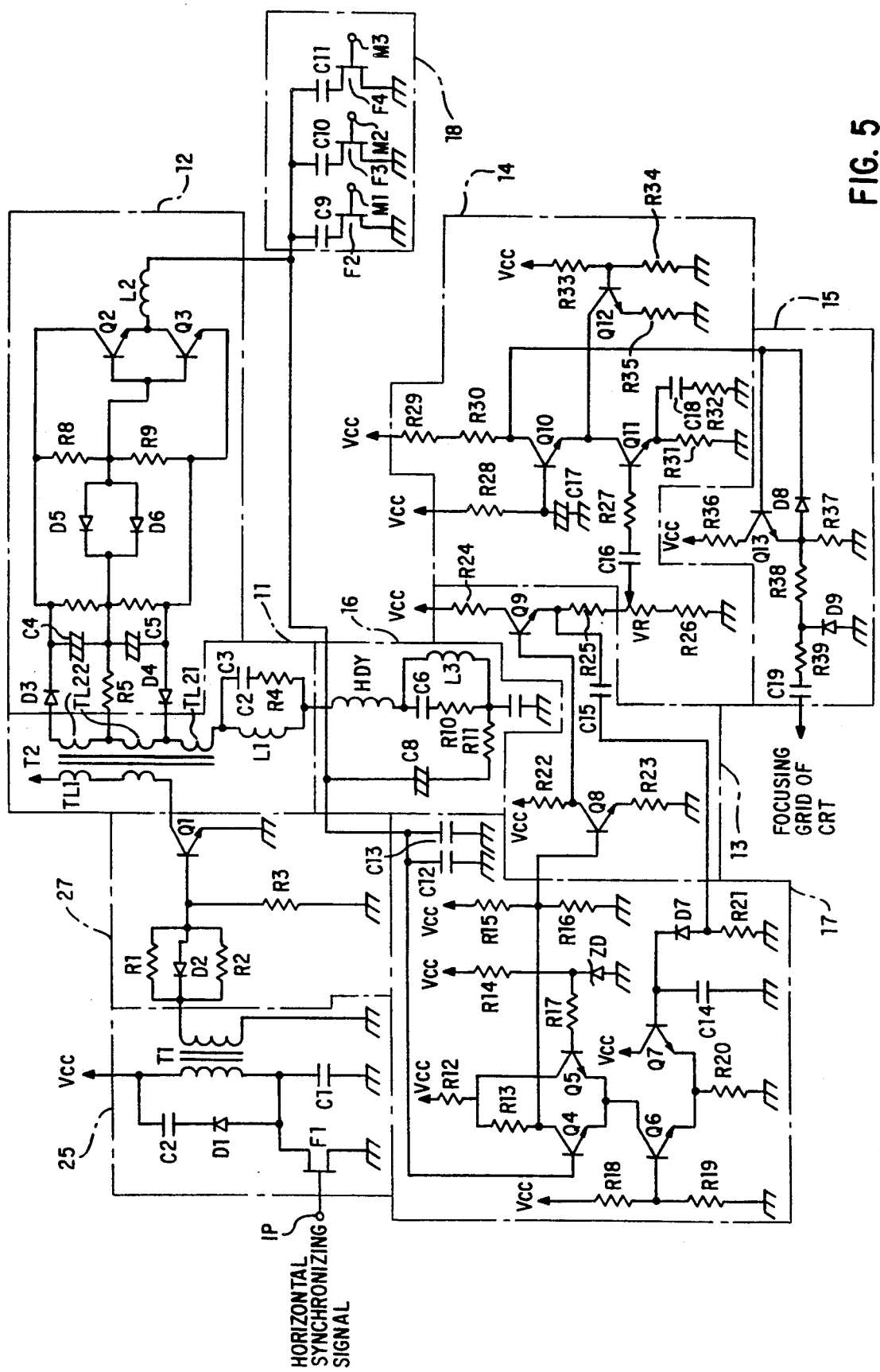
FIG. 5 is a detailed circuit diagram of the horizontal driving portion, the horizontal output portion, and the edge focus controller shown in FIG. 4.
Figure 6A:
FIGS. 6A to 6K show the output waveforms outputted at the several portions of the circuit shown in FIG. 5.
Figure 6B:
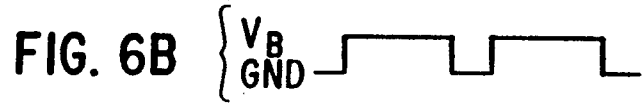

FIG. 5 shows a detailed circuit diagram of the horizontal driving portion 25, the horizontal output portion 27, and the edge focus controller 1 shown in FIG. 4. Referring to FIG. 5, the horizontal driving portion 25 is composed of a field effect transistor (FET) F1, a diode D1, a signal transformer T1 and two capacitors C1 and C2. The FET F1 inverts a horizontal driving signal, as shown in FIG. 6A, applied to its gate through an input terminal IT, and supplies it to the signal transformer T1. The signal transformer T1 inverts and boosts the signal from the FET F1, generating a signal as shown in FIG. 6B. The capacitor C1 improves the rising edge and falling edge of the inverted horizontal driving signal applied to the signal transformer T1.

Figure 6C:
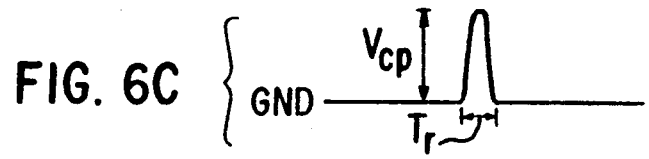

The horizontal output portion 27 is composed of a diode D2, a transistor Q1, and three resistors R1 to R3. The transistor Q1 waveform-converts the boosted signal in FIG. 6B applied to its base through a parallel circuit composed of two resistors R1 and R2 and the diode D2 from the signal transformer T1, into a flyback pulse shown in FIG. 6C, and then supplies the flyback pulse to the horizontal dummy transformer circuit 11. The diode D2 has a speed-up function.

Figure 6D:
Figure 6E:
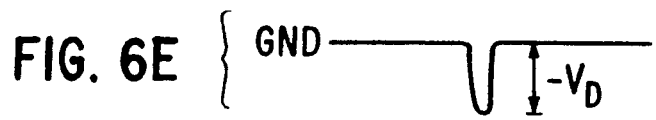

The horizontal dummy transformer circuit 11 comprises a dummy transformer T2, a coil L1, a capacitor C5, and a resistor R8. The dummy transformer T2 comprising a primary coil TL1, a secondary coil TL21, and an auxiliary coil TL22 transforms the flyback pulse supplied from the transistor Q1 to the primary coil TL1 and derives the transformed flyback pulse on the secondary coil TL21 and the auxiliary coil TL22. The flyback pulses as shown in FIG. 6D and the inverted flyback pulse as shown in FIG. 6E are derived on the first and third terminals TL221 and TL223, respectively, of the auxiliary coil TL22 of the dummy transformer T2. The inverted flyback pulse as shown in FIG. 6E is derived on the secondary coil TL21 of the dummy transformer T2, and is applied to the parabolic output circuit 16 through the serial circuit composed of the resistor R4 and the capacitor C3, and the coil L1 connected in paralled with the serial circuit.

The voltage circuit 12 comprises a coil L2, two transistors Q2 and Q3, two capacitors C4 and C5, four diodes D3 to D6, and five resistors R5 to R9.

The diodes D3 and D4 rectify the positive and negative flyback pulses derived on the first and second terminals of the auxiliary coil TL22 of the dummy transformer T2. The capacitors C4 and C5 then integrate the signal rectified by the diodes D3 and D4 to generate a DC voltage. The DC voltage integrated by the capacitors C4 and C5 is supplied to the multi-sync mode portion 18 and the differential amplifying circuit 17 through the transistors Q2 and Q3 and the coil L2. The DC voltage supplied to the multi-sync mode portion 18 and the differential amplifying portion 17 through the two transistors Q2 and Q3 and the coil L2 varies according to the frequency of flyback pulse, i.e., the frequency of the horizontal sync signal.

The multi-sync mode portion 18 is composed of three capacitors C10 to C12 and three FETs F2 to F4. The three FETs F2 to F4 open/close the current passages of the capacitors C10 to C12 according to the logic state of the three-bit mode control signal supplied to the respective gates M1 to M3 to generate a mode selection signal.

Figure 6F:

The parabolic output circuit 16 comprises a horizontal deflecting yoke HDY, a coil L3, three capacitors C6 to C8, and two resistors R10 and R11. The capacitor C7 integrates the inverted flyback pulse supplied to the horizontal deflecting yoke HDY from the secondary coil TL21 of the dummy transformer T2, thereby generating a parabolic signal such as that of FIG. 6F. The parabolic signal is supplied to the base of the transistor Q4 through the resistor R10 and the capacitor C8.

Figure 6G:
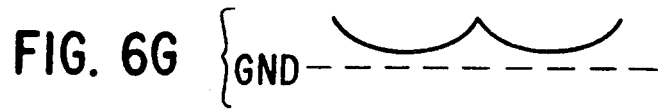

The differential amplifying circuit 17 is composed of four transistors Q4 to Q7, a zener diode ZD, a diode D7, three capacitors C12 to C14, and ten resistors R12 to R21. The differential amplifying circuit 17 combines the mode selection signal supplied from the multi-sync mode portion 18 and the parabolic signal supplied from the parabolic output circuit 16, and levels up the combined signal by the DC voltage supplied from the voltage circuit 12. Then the differential amplifying circuit 17 amplifies the combined and leveled-up parabolic signal by the four transistors Q4 to Q7 and supplies a parabolic signal such as that of FIG. 6G to the two-stage amplifying circuit 13. The combined and leveled-up parabolic signal is amplified at amplifying rates which vary by the four transistors Q4 to Q7 according to the magnitude of the emitter voltage of the transistor Q9. When the emitter voltage of the transistor Q9 is high, the emitter current of the transistor Q7 is increased and the emitter current of the transistor Q4 is decreased. In this case, the combined and leveled-up parabolic signal supplied to the base of the transistor Q4 is amplified at a low amplifying rate and is supplied to the base of the transistor Q8 through the collector of the transistor Q4. On the other hand, when the emitter voltage of the transistor Q9 is low, the emitter current of the transistor Q7 is decreased and the emitter current of the transistor Q4 is increased. In thus case, the combined and leveled-up parabolic signal supplied to the base of the transistor Q4 is amplified at a high amplifying rate and is supplied to the base of the transistor Q8 through the collector of the transistor Q4.

Figure 6H:
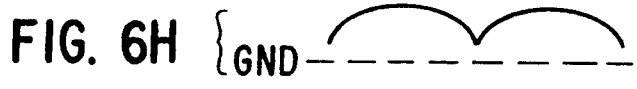

The two-stage amplifying circuit 13 comprises two transistors Q8 and Q9, a capacitor C15, and four resistors R22 to R25. The transistor Q8 inverts and amplifies the differential-amplified parabolic signal supplied from the differential amplifying circuit 17, yielding the signal shown in FIG. 6H. The transistor Q9 amplifies the output of the transistor Q8 and supplies the amplified parabolic signal to the connection of the diode D7 and the resistor R21 of the differential amplifying circuit 17 through the capacitor C15 and also to the cascode amplifying circuit 14 through the resistor R25.

Figure 6I:
Figure 6J:
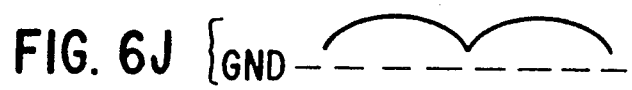

The cascode amplifying circuit 14 is composed of ten resistors R26 to R35, three capacitors C16 to C18, a variable resistor VR, and three transistors Q10 to Q12. The variable resistor VR adjusts the amplitude of the parabolic signal supplied through a resistor R25 from the emitter of the transistor Q9, according to the manufacturer's or user's selection, yielding a signal such as that shown FIG. 6I. The amplitude-adjusted parabolic signal is amplified by the three transistors Q10 to Q12, as shown in FIG. 6J, and is then supplied to the output amplifying circuit 15. The frequency characteristic of the parabolic signal supplied to the output amplifying circuit 15 is improved by the two resistors R31 and R32 and the capacitor C18.

Figure 6K:

The output amplifying circuit 15 comprises two diodes D8 and D9, a capacitor C19, a transistor Q13, and four resistors R36 to R39. The transistor Q13 inverts the parabolic signal supplied to its base from the cascode amplifying circuit 14, as shown in FIG. 6K, and then supplies the inverted parabolic signal to the fourth grid 30 of the CRT through the two resistors R38 and R39 and the capacitor C19.

As described above, the present invention has the advantage of adjusting the amplitude and frequency characteristic of the parabolic signal, so that the focus of the electron beam scanned at the edges of a planar CRT screen or a CRT screen used as a multi-sync mode can be formed precisely.

What is claimed is:

1. A horizontal focus circuit in an image display including
   a cathode ray tube and a horizontal output portion for generating a flyback pulse, comprising:
   a horizontal dummy transformer for transforming a flyback pulse supplied from said horizontal output portion;
   a parabolic output circuit for generating a parabolic signal from the transformed flyback pulse supplied from said horizontal dummy transformer;
   a voltage circuit for rectifying and integrating the transformed flyback pulse from said horizontal dummy transformer to generate a direct current voltage;
   a mode selection portion for generating a mode selection signal according the sync frequency;
   a differential amplifying circuit for combining the mode selection signal supplied from said mode selection portion and a parabolic signal supplied from said parabolic output circuit, leveling up the direct current voltage of the combined signal by the direct current voltage circuit, and amplifying said combined and leveling-up parabolic signal; and
   a cascode amplifying circuit for controlling and amplifying the amplitude and frequency characteristic of the parabolic signal supplied from said differential amplifying circuit and supplying the controlled and amplified parabolic signal to a focusing grid of said cathode ray tube.

2. A circuit as claimed in claim 1, further comprising a two-stage amplifying circuit being connected between said differential amplifying circuit and said cascode amplifying circuit, for amplifying the output of said differential amplifying circuit.

3. A circuit as claimed in claim 2, further comprising a feedback loop being connected between said two-stage amplifying circuit and said differential amplifying circuit, for automatically controlling the gain of said differential amplifying circuit according to the amplitude of the parabolic signal supplied from said parabolic output circuit.

4. A circuit as claimed in claim 3, further comprising an output amplifying circuit being connected between said cascode amplifying circuit and the focusing grid of said cathode ray tube, for buffering the output of said cascode amplifying circuit.

5. A circuit as claimed in claim 4, wherein said cascode amplifying circuit comprises transistors.

* * * * *